United States Patent Office 3,213,089
Patented Oct. 19, 1965

3,213,089
MEROCYANINES AND PLANAR UNDISSOCIATED CYANINES
Donald W. Heseltine and Leslie G. S. Brooker, Rochester, N.Y., assignors to Eastman Kodak Company, Rochester, N.Y., a corporation of New Jersey
No Drawing. Filed Feb. 5, 1960, Ser. No. 6,889
9 Claims. (Cl. 260—240.1)

This invention relates to new merocyanine dyes, planar undissociated cyanine dyes, intermediates for preparing these new dyes, and photographic silver halide emulsions sensitized with these new dyes.

This application is a continuation-in-part of our application Serial No. 607,236, filed August 30, 1956, now U.S. Patent 2,927,026, issued March 1, 1960.

Accordingly, it is an object of our invention to provide new merocyanine dyes and planar undissociated cyanine dyes. Another object is to provide methods for making these new dyes. Still another object is to provide new intermediates for making these dyes and methods for making these new intermediates. Another object is to provide photographic silver halide emulsions sensitized with the new dyes of our invention. Other objects will become apparent from a consideration of the following description and examples.

The new merocyanine dyes of our invention include those dyes represented by the following general formula:

(I)
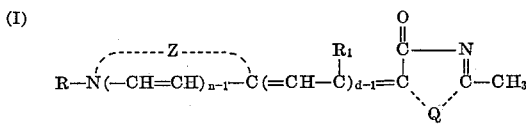

wherein R represents a substituted or unsubstituted alkyl group, such as methyl, ethyl, n-propyl, isopropyl, n-butyl, isobutyl, n-amyl, carboxymethyl, $\beta$-carboxyethyl, carbomethoxymethyl, carbethoxymethyl, $\beta$-methoxyethyl, allyl (vinylmethyl), benzyl (phenylmethyl), etc., (e.g., an alkyl group of the formula $C_nH_{2n+1}$ wherein $n$ represents a positive integer of from 1 to 4), $R_1$ represents a hydrogen atom, an alkyl group, such as methyl, ethyl, propyl, etc. (a lower alkyl group, for example), or an aryl group, such as phenyl, tolyl, chlorophenyl, etc. (e.g., a mononuclear aromatic group of the benzene series containing from 6 to 7 carbon atoms), $n$ represents a positive integer of from 1 to 2, $d$ represents a positive integer of from 1 to 3 (when $d$ is 3, $R_1$ is always a hydrogen atom), Q represents an oxygen atom or a divalent sulfur atom, or alternatively, Q represents the non-metallic atoms necessary to complete a heterocyclic nucleus containing 6 atoms in the heterocyclic ring (especially where 4 of said atoms are carbon atoms and the remaining atoms are sulfur or nitrogen atoms), and Z represents the non-metallic atoms necessary to complete a heterocyclic nucleus containing from 5 to 6 atoms in the heterocyclic ring, such as those selected from the group consisting of those of the thiazole series (e.g., thiazole, 4-methylthiazole, 5-methylthiazole, 4-phenylthiazole, 5-phenylthiazole, 4,5-dimethylthiazole, 4,5-diphenylthiazole, 4-(2-thienyl)thiazole, etc.), those of the benzothiazole series (e.g., benzothiazole, 4-chlorobenzothiazole, 5 - chlorobenzothiazole, 6 - chlorobenzothiazole, 7-chlorobenzothiazole, 4-methylbenzothiazole, 5-methylbenzothiazole, 6-methylbenzothiazole, 5-bromobenzothiazole, 6 - bromobenzothiazole, 4 - phenylbenzothiazole, 5-phenylbenzothiazole, 4-methoxybenzothiazole, 5-methoxybenzothiazole, 6-methoxybenzothiazole, 5-iodobenzothiazole, 6 - iodobenzothiazole, 4 - ethoxybenzothiazole, 5-ethoxybenzothiazole, tetrahydrobenzothiazole, 5, 6-dimethoxybenzothiazole, 5,6 - dioxymethylenebenzothiazole, 5-hydroxybenzothiazole, 6-hydroxybenzothiazole, etc.), those of the naphthothiazole series (e.g., $\alpha$-naphthothiazole (i.e., [2,1]-naphthothiazole), $\beta$-naphthothiazole (i.e., [1,2]-naphthothiazole), 5-methoxy-$\beta$-naphthothiazole, 5-ethoxy-$\beta$-naphthothiazole, 7-methoxy-$\alpha$-naphthothiazole, 8-methoxy-$\alpha$-naphthothiazole, etc.), those of the thianaphtheno-7',6',4,5-thiazole series (e.g., 4'-methoxythianaphtheno-7',6',4,5-thiazole, etc.), those of the oxazole series (e.g., 4-methyloxazole, 5-methyloxazole, 4-phenyloxazole, 4,5-diphenyloxazole, 4-ethyloxazole, 4,5-dimethyloxazole, 5-phenyloxazole, etc.), those of the benzoxazole series (e.g., benzoxazole, 5-chlorobenzoxazole, 5-phenylbenzoxazole, 5-methylbenzoxazole, 6-methylbenzoxazole, 5,6 - dimethylbenzoxazole, 4,6 - dimethylbenzoxazole, 5-methoxybenzoxazole, 6-methoxybenzoxazole, 5-ethoxybenzoxazole, 6-chlorobenzoxazole, 5-hydroxybenzoxazole, 6-hydroxybenzoxazole, etc.), those of the naphthoxazole series (e.g., $\alpha$-naphthoxazole, $\beta$-naphthoxazole, etc.), those of the selenazole series (e.g., 4-methylselenazole, 4-phenylselenazole, etc.), those of the benzoselenazole series (e.g., benzoselenazole, 5-chlorobenzoselenazole, 5-methoxybenzoselenazole, 5-hydroxybenzoselenazole, tetrahydrobenzoselenazole, etc.), those of the naphthoselenazole series (e.g., $\alpha$-naphthoselenazole, $\beta$-naphthoselenazole, etc.), those of the thiazoline series (e.g., thiazoline, 4-methylthiazoline, etc.), those of the 2-quinoline series (e.g., quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), those of the 4-quinoline series (e.g., quinoline, 6-methoxyquinoline, 7-methylquinoline, 8-methylquinoline, etc.), those of the 3,3-dialkylindolenine series (e.g., 3,3-dimethylindolenine, 3,3,5-trimethylindolenine, 3,3,7-trimethylindolenine, etc.), those of the 2-pyridine series (e.g., pyridine, 3-methylpyridine, 4-methylpyridine, 5-methylpyridine, 6-methylpyridine, 3,4-dimethylpyridine, 3,5-dimethylpyridine, 3,6-dimethylpyridine, 4,5-dimethylpyridine, 4,6-dimethylpyridine, 4-chloropyridine, 5-chloropyridine, 6-chloropyridine, 3-hydroxypyridine, 4-hydroxypyridine, 5-hydroxypyridine, 6-hydroxypyridine, 3-phenylpyridine, 4-phenylpyridine, 6-phenylpyridine, etc.), those of the 4-pyridine series (e.g., 2-methylpyridine, 3-methylpyridine, 2-chloropyridine, 3-chloropyridine, 2,3-dimethylpyridine, 2,5-dimethylpyridine, 2,6-dimethylpyridine, 2-hydroxypyridine, 3-hydroxypyridine, etc.), etc.

According to our invention, we provide the new dyes represented by Formula I above wherein $d$ represents 1, by reacting together a cyclammonium quaternary salt selected from those represented by the following general formula:

(II)
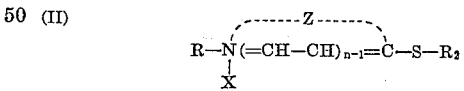

wherein R, $n$, and Z each have the values given above, $R_2$ represents an alkyl group (e.g., methyl, ethyl, etc.), or an aryl group (e.g., phenyl, o-, m-, and p-tolyl, etc.), and X represents an acid anion, such as chloride, bromide, iodide, thiocyanate, sulfamate, methylsulfate, ethylsulfate, perchlorate, benzenesulfonate, p-toluenesulfonate, etc., with a compound selected from those represented by the following general formula:

(III)
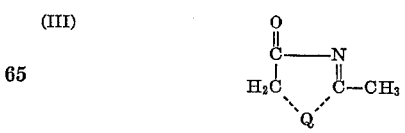

wherein Q has the values given above.

The new dyes represented by Formula I above wherein $d$ represents 2 or 3 ($R_1$ represents a hydrogen atom) can be prepared by condensing a cyclammonium quaternary salt selected from those represented by the following general formula:

(IV) 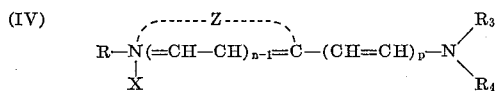

wherein R, $n$, X and Z each have the values given above, $R_3$ represents an acyl group (e.g., acetyl, propionyl, benzoyl, etc.), $R_4$ represents an aryl group (e.g., phenyl, o-, m- and p-tolyl, etc.), and $p$ represents a positive integer of from 1 to 2, with a compound selected from those represented by Formula III above.

The new dyes of our invention represented by Formula I above wherein $d$ represents 2 and $R_1$ represents an alkyl or an aryl group can advantageously be prepared by condensing together a compound selected from those represented by the following general formula:

(V) 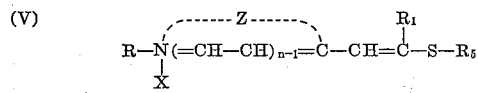

wherein R, X, $n$, Z and $R_1$ each have the values given above, and $R_5$ has the same values assigned above to $R_2$, with a compound selected from those represented by Formula III above. The intermediates of Formulas II and IV are well known in the art, while the intermediates of Formula V can be prepared according to the general method described in U.S. Patent 2,315,498, issued April 6, 1943.

The condensations of the compounds of Formula III with those of Formulas II, IV or V can advantageously be accelerated by heating the reaction mixture, generally temperatures varying from ambient temperature (ca. 20° C.) to the reflux temperature of the reaction mixture being satisfactory. The condensations can be carried out in the presence of an inert solvent, such as pyridine, nitrobenzene, ethanol, n-propanol, isopropanol, n-butanol, etc.

The condensations of the compounds of Formula III with those of Formulas II, IV or V can advantageously be carried out in the presence of a basic condensing agent, such as the trialkylamines (e.g., triethylamine, tri-n-propylamine, triisopropylamine, tri-n-butylamine, tri-isobutylamine, tri-n-amylamine, etc.), N-alkylpiperidines (e.g., N-methylpiperidine, N-ethylpiperidine, etc.), N,N-dialkylanilines (e.g., N,N-dimethylaniline, diethylaniline, etc.), etc.

We have found that the methyl group shown in the compounds of Formula I is reactive and that the compounds of Formula I can be further reacted with a second molecule of the intermediates of Formulas II, IV or V. Such condensations provide a new class of dyes represented by the following general formula:

(VI) 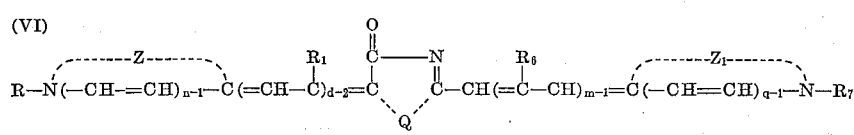

wherein R, $R_1$, $n$, $d$, Z and Q each have the values given above, $m$ represents the same values assigned to $d$ above, $q$ represents the same values assigned to $n$ above, $R_6$ represents the same values assigned to $R_1$ above, $R_7$ represents the same values assigned to R above and $Z_1$ represents the same values assigned to Z above. It is to be understood that the values for $m$, $q$, $R_6$, $R_7$ and $Z_1$ are based on the use of intermediates corresponding to those of Formulas II, IV and V above, except for the substitutions indicated. Different values have been assigned, since it is immediately apparent that the same intermediate need not be used in the second condensation wherein the compound of Formula I above is condensed with one of the intermediates of Formulas II, IV or V. Since the dyes of Formula VI contain two basic nuclei linked through an acidic nucleus and the dyes are deeply colored, they can be classified as undissociated cyanines, for it is felt that the deep color is the result of a mode of resonance wherein the dye molecule can be represented as follows:

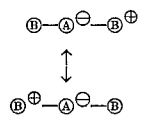

wherein Ⓑ stands for a basic nucleus and Ⓐ for an acidic nucleus. The essence of such a resonance scheme is that a positive charge is shared, as in a conventional cyanine dye between the two basic rings, while the negative charge resides in the acidic nucleus. The general term undissociated cyanine includes the earlier reported holopolar cyanine dyes, but whereas these latter dyes are typically non-planar, the present dyes are essentially planar.

A group of intermediates useful in the present invention is that represented by the following general formula:

(VII) 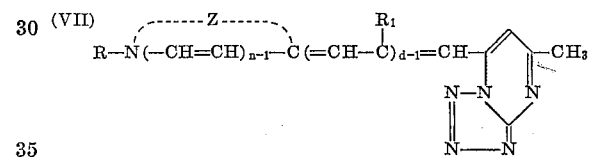

wherein R, $R_1$, $n$, $d$, and Z each have the values given above. The methyl group in the above compounds is also reactive, and can be condensed with the intermediates represented by Formulas II, IV and V to provide dyes represented by the following general formula:

(VIII) 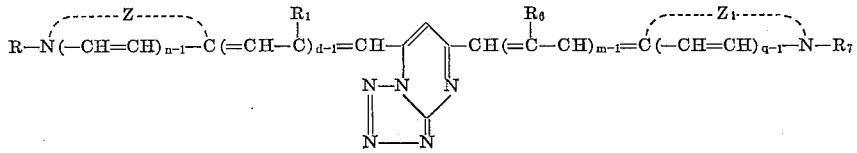

wherein R, $R_1$, $R_6$, $R_7$, $n$, $d$, $m$, $q$, Z and $Z_1$ each have the values given above.

The new dyes represented by Formula VII above can advantageously be prepared by condensing an intermediate selected from those represented by Formulas II, IV and V above with the compound represented by the following formula:

(VIIa) 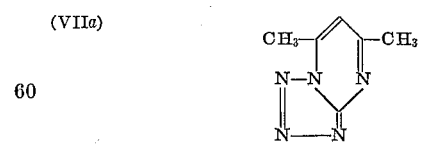

The condensations of the compounds represented by Formula VII with those of Formulas II, IV or V, and the condensation of the compounds of Formulas II, IV or V with the compound of Formula VIIa, can be accelerated by heating and by use of the inert diluents and basic condensing agents mentioned above. The new dyes represented by Formula VIII are similar to those represented by Formula VI above in that these dyes have two basic nuclei linked together through an acidic central nucleus.

The compounds selected from those represented by Formula VI above can also be prepared by condensing a compound selected from those represented by the following general formula:

(IX)
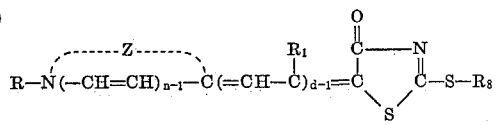

wherein R, $R_1$, $n$, $d$ and Z each have the values given above, and $R_8$ represents a lower alkyl group, such as methyl, ethyl, etc., with a cyclammonium quaternary salt containing a reactive methyl group, such as those represented by the following general formula:

(X)
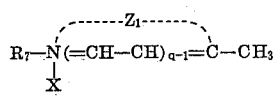

wherein $R_7$, X, $q$ and $Z_1$ each have the values given above. The intermediates selected from those represented by Formula IX above can be prepared as described in U.S. Patent No. 2,177,402. The merocyanine dyes represented by Formula IX above can also be reacted with the new merocyanine dyes represented by Formula I above after the dyes represented by Formula IX above have been quaternated with an alkyl salt, such as methyl-p-toluenesulfonate. This condensation between the dyes represented by Formula IX and those represented by Formula I provides tetranuclear dyes, such as the following:

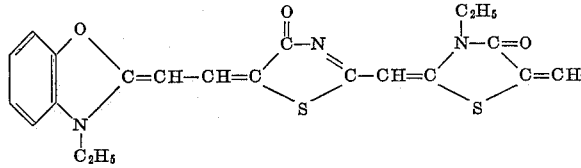

The dyes represented by Formulas I and VII can be quaternated by heating with an alkyl salt to provide quaternated dyes which can also be reacted with certain intermediates, such as those presented by Formulas II, III, IV and V above.

Intermediates which are useful in providing the dyes represented by Formula I include the following:

(1) 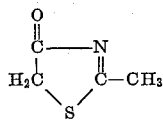

(2) 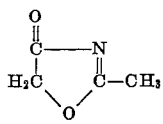

(3) 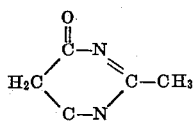

(4) 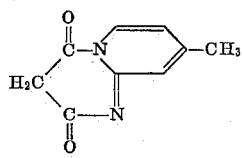

wherein R' has the values given above.

The following examples will serve to illustrate more fully the manner of practicing our invention.

*Example 1.—5-(3-ethyl-2(3H)-benzothiazolylidene)-2-methylthiazolin-4-one*

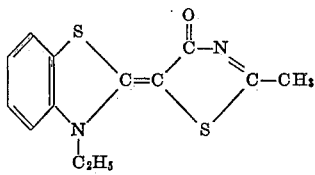

Thioacetamide (7.5 g., 10 mols.) and chloroacetamide (9.4 g., 10 mols.) were dissolved in ethyl alcohol (25 ml.) heated to the refluxing temperature and then allowed to stand at room temperature for one hour. After removal of the precipitated ammonium chloride by filtration, 3-ethyl-2-ethylmercaptobenzothiazolium ethylsulfate (3.35 g., 1 mol.) and triethylamine (1.4 ml., 1 mol.) were added, the reaction mixture was heated until the reactants had gone into solution and it was then allowed to stand at room temperature overnight. The crude dye was preciptated by the addition with stirring of water (200 ml.). The aqueous solution was then decanted and the residue stirred with methyl alcohol until crystalline. After chilling overnight, the crude dye was filtered off, washed with a little methyl alcohol and dried. The yield of purified dye after two recrystallizations from benzene was 20%, M.P. 224–225° C. dec.

*Example 2.—5-(3-ethyl-2(3H)-benzoxazolylidene) ethylidene-2-methylthiazolin-4-one*

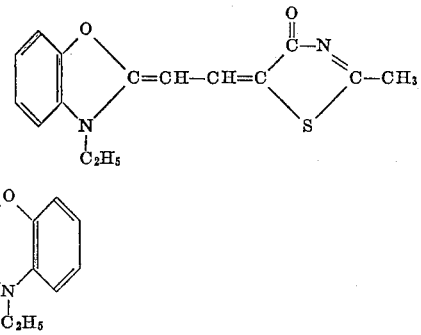

Thioacetamide (7.5 g., 10 mols.) and chloroacetamide (9.4 g., 10 mols.) were dissolved in ethyl alcohol (25 ml.) and heated to the reflux temperature. After the mixture had slowly cooled to room temperature, the ammonium chloride was filtered off and discarded. 2-β-acetanilidovinyl-3-ethylbenzoxazolium iodide (4.34 g., 1 mol.) and triethylamine (2.8 ml., 2 mols.) were then added to the filtrate and the mixture warmed until all of the reactants were in solution. After standing at room temperature for two hours, the crude dye was filtered off, washed with a little methyl alcohol and dried. After two recrystallizations from methyl alcohol and one from benzene, the yield of purified dye was 10%, M.P. 230–31° C. dec.

*Analysis.*—Calcd. for $C_{15}H_{15}N_2O_2S$: N, 9.8%. Found: N, 9.9%.

*Example 3.—5-(3-ethyl-2(3H)-benzothiazolylidene) ethylidene-2-methylthiazolin-4-one*

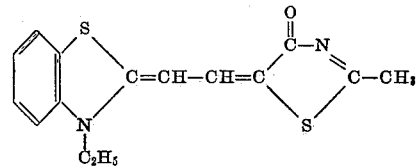

Thioacetamide (7.5 g., 10 mols.) and chloroacetamide (9.39 g., 10 mols.) were dissolved in ethyl alcohol and heated to the refluxing temperature. The mixture was allowed to stand at room temperature for one hour and then the ammonium chloride was filtered off and discarded. 2-β-acetanilido-3-ethylbenzothiazolium iodide (4.5 g., 1 mol.) and triethylamine (2.8 ml., 2 mols.) were then added to the filtrate and the mixture warmed sufficiently to dissolve the reactants. After standing two hours at room temperature, the crude dye was filtered off, washed with a little methyl alcohol and dried. After two recrystallizations from methyl alcohol and one from benzene, the yield of pure dye was 9%, M.P. 228–9° C. dec.

*Analysis.*—Calcd. for $C_{15}H_{15}N_2OS_2$: N, 9.3%. Found: N, 9.3%.

*Example 4.*—*7-[(3-ethyl-2(3H)-benzothiazolylidene) propenyl]-5-methyltetrazolo[a]pyrimidine*

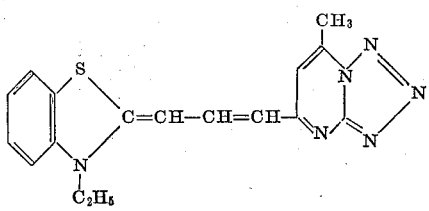

5,7-dimethyltetrazolo[a]pyrimidine (1.49 g., 1 mol.), 2-β-acetanilidovinyl-3-ethylbenzothiazolium iodide (4.50 g., 1 mol.) and triethylamine (1.5 ml., 1 mol.+10%) were dissolved in ethyl alcohol (15 ml.) and heated under reflux for 30 minutes. After chilling, the crude dye was thrown out of solution by the addition with stirring of water. The aqueous portion was decanted and the residue dissolved in acetone and again precipitated with water. The solid was filtered off and extracted with boiling benzene. The benzene solution of the dye was filtered, concentrated and chilled. The crude dye was then filtered off and dried. After two recrystallizations from ethyl alcohol, the yield of pure dye was 0.20 g. (6%), M.P. 190–91° C. dec.

*Analysis.*—Calcd. for $C_{17}H_{16}N_6S$: N, 25.0%. Found: N, 24.7%.

*Example 5.*—*5,7-di[(3-ethyl-2(3H)-benzothiazolylidene) propenyl]tetrazolo[a]pyrimidine*

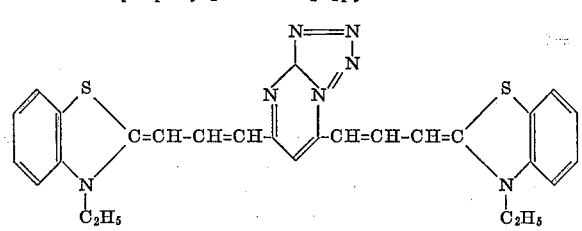

5,7-dimethyltetrazolo[a]pyrimidine (1.49 g., 1 mol.), 2-β-acetanilidovinyl-3-ethylbenzothiazolium iodide (9.0 g., 2 mols.) and triethylamine (3.1 ml., 2 mols.+10%) were dissolved in pyridine (15 ml.) and heated under reflux for 20 minutes. The reaction mixture was chilled and the crude dye was precipitated with water. The aqueous portion was decanted and the residue dissolved in pyridine and precipitated with methyl alcohol. The crude dye was filtered off, washed with methyl alcohol and dried. The crude product was twice recrystallized by dissolving in hot pyridine, filtering and precipitating with methanol. The yield of purified dye was 0.6 g. (12%), M.P. 205–6° C. dec.

*Analysis.*—Calcd. for $C_{28}H_{25}N_7S_2$: N, 18.7%. Found: N, 18.3%.

*Example 6.*—*1-phenyl-5-[(1,3,3-trimethyl-2(3H)-indolylidene)ethylidene]-2-[3-(1,3,3-trimethyl-2(3H)-indolylidene)propenyl]-4,8(1H,5H)-pyrimidinedione*

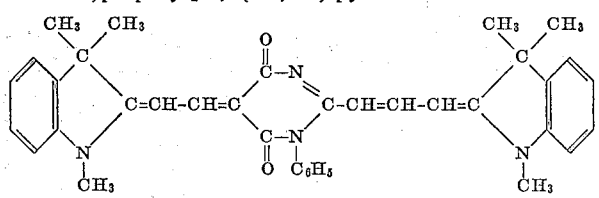

6-hydroxy-2-methyl-3-phenyl-4(3H)-pyrimidone (1 g., 1 mol.), 2-β-acetanilidovinyl-1,3,3-trimethylpseudoindolium iodide (5.7 g., 2 mols.+50%), and triethylamine (1.4 ml., 2 mols.) were dissolved in pyridine (15 ml.) and heated under reflux for ten minutes. The reaction mixture was chilled, filtered and the crude dye washed with ethyl alcohol and dried. The crude dye was twice recrystallized by dissolving in pyridine, filtering and precipitating with methyl alcohol. The yield of purified dye was 0.7 g. (25%), M.P. 275–7° C. dec.

*Example 7.*—*5 - [(1 - ethyl - 2(1H)-quinolylidene)ethylidene]-2-[3-(1-ethyl - 2(1H)-quinolylidene)propenyl]-1-phenyl-4,6(1H,5H)pyrimidinedione hydroiodide*

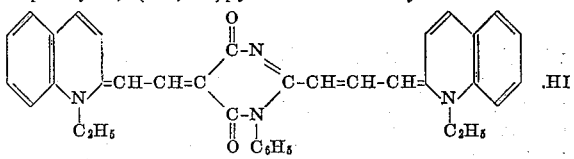

6-hydroxy-2-methyl-3-phenyl-4-(3H)-pyrimidone (1 g., 1 mol.), 2-β-acetanilidovinyl-1-ethylquinolinium iodide (5.5 g., 2 mols.+50%) and triethylamine (1.4 ml., 2 mols.) were dissolved in pyridine (15 ml.) and heated under reflux for ten minutes. After cooling, the crude dye was filtered off, washed with methyl alcohol and then with water and dried. The crude dye was recrystallized by dissolving in cresol, filtering and precipitating with methyl alcohol. The yield of purified dye was 2.8 g. (80%), M.P. 244–6° C. dec.

*Example 8.*—*5 - (3 - ethyl - 2(3H) - benzothiazolylidene) - 2 - (3 - ethyl - 2(3H) - benzothiazolylidene) methylthiazolin-4-one*

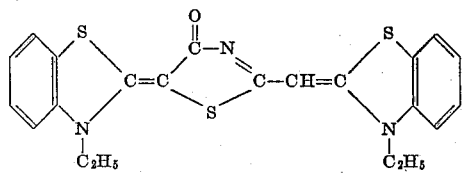

5 - (3 - ethyl - 2(3H) - benzothiazolylidene) - 2 - methylthiazolin-4-one (1.05 g., 1 mol.), 3-ethyl-2-ethylmercaptobenzothiazolium ethylsulfate (2.46 g., 1 mol.+100%) and triethylamine (1.1 ml., 1 mol.+100%) were dissolved in pyridine and heated under reflux for ten minutes. The crude dye was then precipitated by the addition of water (100 ml.) and filtered. The crude dye was stirred with methyl alcohol, filtered and dried. After two recrystallizations from pyridine and methyl alcohol, the yield of purified dye was 0.37 g. (22%), M.P. >320° C.

*Example 9.*—*5 - (3 - ethyl - 2(3H) - benzothiazolylidene) - 2 - (3 - ethyl - 2(3H) - benzothiazolylidene) propenyl-thiazolin-4-one*

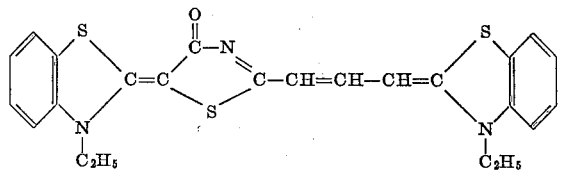

5 - (3 - ethyl - 2(3H) - benzothiazolylidene) - 2 - methylthiazolin-4-one (0.75 g., 1 mol.), 2-β-acetanilidovinyl-3-ethylbenzothiazolium iodide (1.22 g., 1 mol.) and triethylamine (0.74 ml., 1 mol.+100%) were dissolved in pyridine (10 ml.) and heated under reflux for ten minutes. The crude dye was precipitated by pouring into water (100 ml.) and was then filtered off, washed with methyl alcohol and dried. The crude dye was dissolved in hot acetic acid and the dye hydroiodide precipitated by the adidtion of sodium iodide (1 g.). The dye hydroiodide was filtered off, suspended in methyl alcohol and the base liberated by the addition of excess triethylamine. The free base was then filtered off and dried. After two recrystallizations by dissolving in pyridine and precipitating with 70% aqueous methanol, the yield of pure dye was 0.42 g. (33%), M.P. 224–5° C. dec.

*Example 10.*—*5 - [(3 - ethyl - 2(3H) - benzothiazolylidene)ethylidene] - 2 - [(3 - ethyl - 2(3H) - benzothiazolylidene)methyl]-2-thiazolin-4-one*

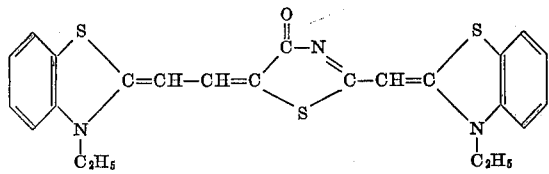

*Method A.*—5 - [(3' - ethyl - 2(3H) - benzothiazolylidene)ethylidene] - 2 - methylthiazolin - 4 - one (0.30 g., 1 mol.), 3-ethyl-2-ethylmercaptobenzothiazolium ethyl sulfate (0.70 g., 1 mol.+100%) and triethylamine (0.28 ml., 1 mol.+100%) were dissolved in pyridine (5 ml.) and heated under reflux for five minutes. The crude dye was precipitated by the addition of water, the aqueous portion decanted and the residue stirred with methyl alcohol until crystalline. The crude dye was filtered off, washed with methyl alcohol and dried. After two recrystallizations from pyridine and methyl alcohol, the yield of purified dye was 0.13 g. (28%). The purified dye alone and after mixture with an authentic sample prepared by method (B), melted at 306–7° C. with decomposition.

*Method B.*—5 - [(3 - ethyl - 2(3H) - benzothiazolylidene)ethylidene] - 2 - methylthio - 4(5H) - thiazolone (Brooker U.S. Patent 2,177,402) (1.7 g., 1 mol.), 3-ethylmethylbenzothiazolium iodide (1.5 g., 1 mol.) and triethylamine (1.4 ml., 2 mols.) were dissolved in pyridine (20 ml.) and heated under reflux for 15 minutes. The reaction mixture was poured into water and the crude product filtered off and washed with methyl alcohol and dried. The crude dye was dissolved in pyridine, filtered and an equal volume of methyl alcohol added to the filtrate. The precipitated dye was filtered off and discarded. The filtrate was then chilled overnight and the desired dye filtered off, washed with methyl alcohol and dried. After two recrystallizations from pyridine and methyl alcohol, the yield of purified dye was 0.4 g. (17%), M.P. 306–7° C.

*Example 11.*—*2 - (3 - ethyl - 2(3H) - benzothiazolylidene)propenyl - 5 - (3 - ethyl - 2(3H) - benzothiazolylidene)ethylidene thiazolin-4-one*

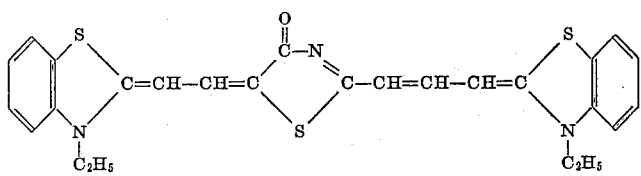

5 - [(3 - ethyl - 2(3H) - benzothiazolylidene)ethylidene]-2-methylthiazolin-4-one (0.30 g., 1 mol.), 2-β-acetanilidovinyl-3-ethylbenzothiazolium iodide (0.45 g., 1 mol.) and triethylamine (0.3 ml., 1 mol.+100%) were dissolved in pyridine (10 ml.) and heated under reflux for ten minutes. The crude dye was precipitated by the addition with stirring of water (100 ml.). After chilling overnight, the crude dye was filtered off, washed with a little methyl alcohol and dried. After two recrystallizations from pyridine and 70% aqueous methyl alcohol, the yield of pure dye was 0.23 g. (46%). The dye melted at 183–5° C. with loss of solvent of crystallization and decomposed at 250° C.

*Example 12.*—*3 - ethyl - 5 - (3 - ethyl - 2(3H) - benzoxazolylidene)ethylidene - 2 - [5 - (3 - ethyl - 2(3H)-benzoxazolylidene)ethylidene - 4 - oxo - 2 - thiazolinyl] methylene-4-thiazolidone*

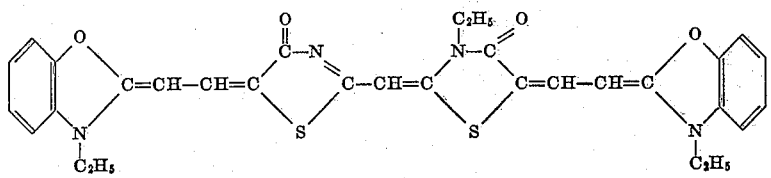

3 - ethyl - 5 - [(3 - ethyl - 2(3H) - benzoxazolylidene)ethylidene]rhodanine (0.45 g., 1 mol.) and methyl p-toluenesulfonate (0.5 g.) were mixed and fused over a free flame and then heated on the steam bath for one hour. 5 - [(3 - ethyl - 2(3H) - benzoxazolylidene)ethylidene]-2-methylthiazolin-4-one (0.45 g., 1 mol.), triethylamine (0.2 ml.) and pyridine (10 ml.) were then added to the melt and the reaction mixture heated under reflux for ten minutes. The reaction mixture was then poured into water (100 ml.). The aqueous solution was decanted and the residue boiled with methyl alcohol (100 ml.), cooled to room temperature and filtered. The crude dye was washed with a little methyl alcohol and dried. After two recrystallizations from pyridine and methyl alcohol, the yield of pure dye was 0.27 g. (31%), M.P. 305–7° C. dec.

*Example 13.*—*3 - [(3 - ethyl - 2(3H) - benzothiazolylidene)ethylidene] - 8 - methyl - 2H - pyrido[1,2 - a] pyrimidine-2,4(3H)-dione*

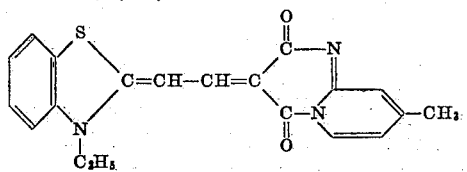

8 - methyl - 2H - pyrido[1,2 - a]pyrimidine-2,4-(3H)-dione (1.76 g., 1 mol.) and 2-β-acetanilidovinyl-3-ethylbenzothiazolium iodide (4.50 g., 1 mol.) were dissolved in ethyl alcohol (20 ml.) and triethylamine (1.4 ml.) was added. The reaction mixture was heated under reflux for twenty minutes and then chilled overnight. The crude dye was collected on a filter, washed with methanol and dried. The dye was purified by recrystallization from methyl alcohol following a treatment with decolorizing carbon (Norit). After two such treatments the yield of purified dye was 1.75 g. (48%), M.P. >300° C.

*Example 14.*—*3 - [(3 - ethyl - 2(3H) - benzothiazolylidene)ethylidene] - 8 - [(3 - ethyl - 2(3H) - benzothiazolylidene)propenyl] - 2H - pyrido[1,2-a]pyrimidine-2,4-(3H)-dione*

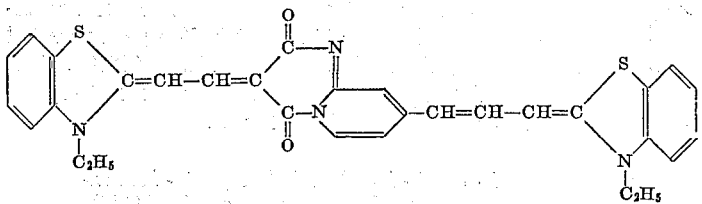

3 - [(3 - ethyl - 2(3H) - benzothiazolylidene)ethylidene] - 8 - methyl - 2H - pyrido[1,2 - a]pyrimidine - 2,4-(3H)-dione (0.54 g., 1 mol.), 2-β-acetanilidovinyl-3-ethylbenzothiazolium iodide (0.67 g., 1 mol.) and triethylamine (0.7 ml.) were suspended in pyridine and the mixture heated under reflux for ten minutes. The crude dye was precipitated by the addition with stirring of aqueous methyl alcohol and was then collected on a filter and dried. The crude dye was purified by dissolving in hot methanol containing a little acetic acid, filtering and making the filtrate basic with triethylamine. The dye was then collected on a filter and dried. After two such treatments, the yield of purified dye was 0.57 g., M.P. 222–4° C. dec.

*Example 15.*—*3 - (3 - ethyl - 2(3H) - benzothiazolylidene) - 8 - [(3 - ethyl - 2(3H) - benzothiazolylidene) methyl] - 2H - pyrido[1,2 - a]pyrimidine - 2,4(3H)-dione*

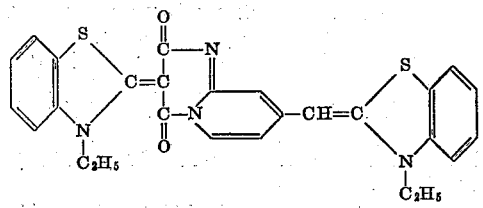

8 - methyl - 2H - pyrido[1,2 - a]pyrimidine - 2,4(3H)-dione (0.88 g., 1 mol.) and 3-ethyl-2-ethylmercaptobenzothiazolium ethyl sulfate (3.35 g., 2 mols.) were dissolved in pyridine (20 ml.) and triethylamine (1.4 ml.) were added. The reaction mixture was heated under reflux for ten minutes then cooled and the dye precipitated by addition with stirring of aqueous methanol. After two recrystallizations from methanol, the yield of purified dye was 0.21 g., M.P. 218–220° C. dec.

*Example 16.*—*5,7-dimethyltetrazolo[a]pyrimidine*

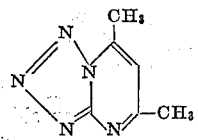

5-aminotetrazole (21 g., 1 mol.), 2,4-pentanedione (25 g., 1 mol.) and piperidine (5 ml.) were dissolved in ethyl alcohol (150 ml.) and heated under reflux for sixteen hours. The reaction mixture was then concentrated to dryness and the product extracted with hot ligroin (90°–120° C.). The product crystallized from the chilled ligroin solution and was filtered off and dried. The yield of recrystallized product was 15 g. (40%), M.P. 148–150° C.

*Example 17.*—*6 - hydroxy - 2 - methyl-3-phenyl-4(3H)-pyrimidone*

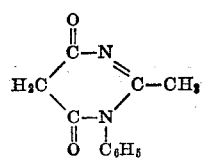

Sodium (13.8 g., 3 mols.) was dissolved in ethyl alcohol (200 ml.) and the solution of sodium ethoxide was then cooled in an ice bath. N-phenylacetamidine hydrochloride (39.5 g.) was then dissolved in ethyl alcohol (125 ml.) and added to the sodium ethylate solution. After ten minutes, the precipitated sodium chloride was filtered off and ethyl malonate (32 g., 2 mols.) was added to the filtrate. The reaction mixture was then heated under reflux for six days. The solid product was then filtered off, dissolved in water and precipitated by acidification with acetic acid. The product (64%) was filtered off, washed with water and dried. After purification by dissolving in ethyl alcohol as the triethylamine salt and precipitating with acetic acid, the yield was 38%, M.P. 173–176° C.

*Example 18.*—*8-methyl-2H-pyrido[1,2-a]pyrimidine - 2,4 (3H)-dione*

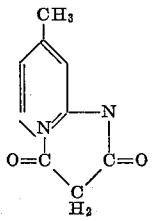

2-amino-4-methylpyridine (54 g., 1 mol.) and diethylmalonate (160 g., 1 mol.+100%) were mixed and heated under gentle reflux in a flask fitted with a still head until the theoretical quantity of ethyl alcohol was collected. The mixture was then chilled and filtered and the crystalline product washed with methanol and dried. After recrystallization from methanol the yield was 25.2 g., M.P. 262–3° C. dec.

In a similar manner, other intermediates can be prepared by replacing the N-phenylacetamidine hydrochloride of Example 16 by other corresponding aryl compounds.

All of the dyes of our invention are particularly useful in manufacturing photographic, silver halide emulsions, serving to alter the sensitivity thereof. Sensitization by means of our new dyes is, of course, directed primarily to the ordinarily employed, gelatino-silver-halide, developing-out emulsions. The dyes are advantageously incorporated in the washed, finished emulsion and should, of course, be uniformly distributed throughout the emulsion. In the preparation of photographic emulsions containing our new dyes, it is only necessary to disperse the dyes in the emulsions. The methods of incorporating dyes in emulsion are simple and well known to those skilled in the art of emulsion making. It is convenient to add the dyes from solutions in appropriate solvents. The solvent must, of course, be compatible with the emulsion and substantially free from any deleterious effect on the light-sensitivity materials. Pyridine (or warm methanol) has proven satisfactory as a solvent for the majority of our new dyes.

The concentration of our new dyes in the emulsion can vary widely, i.e., from about 5 to about 100 mgs. per liter of flowable emulsion. The concentration of the dye will vary according to the type of light-sensitive material in the emulsion and according to the effects desired. The suitable and most economical concentration for any given emulsion will be apparent to those skilled in the art upon making the ordinary tests and observations customarily used in the art of emulsion making.

To prepare a gelatino-silver-halide emulsion sensitized with one of our new dyes, the following procedure is satisfactory: A quantity of the dye is dissolved in pyridine or other suitable solvent and a volume of this solution (which may be diluted with methanol) containing from 5 to 100 mgs. of dye is slowly added to about 1000 cc. of a gelatino-silver-halide emulsion, with stirring. Stirring is continued until the dye is uniformly distributed throughout the emulsion. With most of our new dyes, 10 to 20 mgs. of dye per liter of emulsion suffices to produce the maximum sensitizing effect with the ordinary gelatino-silver-bromide (including bromiodide) emulsions. With fine-grain emulsions, which include most of the ordinarily employed gelatino-silver-chloride emulsions, somewhat larger concentrations of dye may be necessary to secure the optimum sensitizing effect.

The above statements are only illustrative and are not to be understood as limiting our invention in any sense, as it will be apparent that our new dyes can be incorporated by other methods in many of the photographic silver halide emulsions customarily employed in the art. For instance, the dyes can be incorporated by bathing a plate or film upon which an emulsion has been coated, in the solution of the dye, in an appropriate solvent. Bathing methods, however, are not to be preferred ordinarily.

Photographic silver halide emulsions which can advantageously be sensitized by means of the new dyes of our invention comprise the customarily employed gelatino-silver-chloride, gelatino-silver-chlorobromide, gelatino-silver-bromide, and gelatino-silver-bromiodide developing-out emulsions.

Photographic silver halide emulsions, such as those listed above, containing the sensitizing dyes of our invention can also contain such addenda as chemical sensitizers, e.g., sulfur sensitizers (e.g., allyl thiocarbamide, thiourea, allylisothiocyanate, cystine, etc.), various gold compounds (e.g., potassium chloroaurate, auric trichloride, etc.) (see U.S. Patents 2,540,085; 2,597,856 and 2,597,915), various palladium compounds, such as palladium chloride (U.S. 2,540,086), potassium chloropalladate (U.S. 2,598,079), etc., or mixtures of such sensitizers; antifoggants, such as ammonium chloroplatinate (U.S. 2,566,245), ammonium chloroplatinite (U.S. 2,566,263), benzotriazole, nitrobenzimidazole, 5-nitroindazole, benzidine, mercaptans, etc. (see Mees, "The Theory of the Photographic Process," Macmillan Pub., 1942, page 460), or mixtures thereof; hardeners, such as formaldehyde (U.S. 1,763,533), chrome alum (U.S. 1,763,533), glyoxal (U.S. 1,870,354), dibromacrolein (British 406,750), etc.; color couplers, such as those described in U.S. Patent 2,423,730, Spence and Carroll U.S. Patent 2,640,776, etc.; or mixtures of such addenda. Dispersing agents for color couplers, such as those set forth in U.S. Patents 2,322,027 and 2,304,940, can also be employed in the above-described emulsions.

In the manner described above, a number of the dyes of our invention were separately incorporated in an ordinary gelatino-silver-halide emulsion, the dyes being thoroughly incorporated in the emulsions by stirring. After a short digestion, the emulsions were coated onto ordinary cellulose acetate film supports and the coatings exposed in a spectrograph and sensitometer, and then developed in the usual way. The type of emulsion, sensitizing range, and maximum absorption for each of the dyes are indicated in the following table.

| Dye of Example | Emulsion | Sensitizing Range in $m\mu$ | Maximum in $m\mu$ |
|---|---|---|---|
| 2 | Bromo-Iodide | to 550 | 525 |
| 3 | ----do---- | 580 | 555 |
| 6 | ----do---- | 580–660 | -------- |
| 7 | ----do---- | 600–680 | 650 |
| 8 | ----do---- | 585 | 535 |
| 9 | ----do---- | 590–710 | 550+665 |
| 10 | ----do---- | 660 | 620 |
| 11 | ----do---- | 670–760 | -------- |
| 12 | ----do---- | 720 | 525+685 |

Certain of the dyes of our invention form addition salts with inorganic acids, such as hydrogen iodide, hydrochloric acid, phosphoric acid, etc. It is to be understood that our invention contemplates not only these dyes in the form identified by the above general formulas, but in the form of such acid addition salts as well.

What we claim as our invention and desire secured by Letters Patent of the United States is:

1. A compound selected from the class consisting of (a) an uncharged polymethine dye selected from those represented by the following general formula:

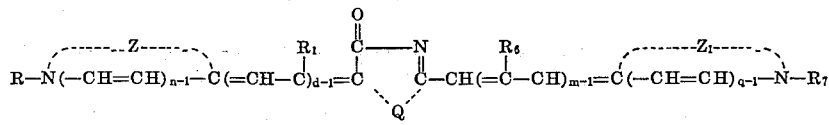

wherein $R$ and $R_7$ each represents a lower alkyl group, $R_1$ and $R_6$ each represents a member selected from the class consisting of hydrogen, lower alkyl, phenyl, tolyl and chlorophenyl; $n$ and $q$ each represents a positive integer of from 1 to 2; $d$ and $m$ each represent a positive integer of from 1 to 3, provided that $R_1$ represents the hydrogen atom when $d$ is 3 and provided that $R_6$ represents the hydrogen atom when $m$ is 3; $Q$ represents a member selected from the class consisting of the divalent sulfur atom, the oxygen atom and the non-metallic atoms necessary to complete a pyrimidine ring; and $Z$ and $Z_1$ each represents the non-metallic atoms necessary to complete a heterocyclic nucleus containing from 5 to 6 atoms in the heterocyclic ring, said nucleus selected from the class consisting of a thiazole nucleus, a benzothiazole nucleus, a naphthothiazole nucleus, a thianaphtheno-7′,6′,4,5-thiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a 2-quinoline nucleus, a 4-quinoline nucleus, a 3,3-dialkylindolenine nucleus, a 2-pyridine nucleus, and a 4-pyridine nucleus, provided that when $Z$ and $Z_1$, respectively, as defined above each represents the non-metallic atoms necessary to complete a heterocyclic nucleus containing 5 atoms in the heterocyclic ring, $n$ and $q$, respectively, each is one, and (b) acid-addition salts of said polymethine dye.

2. A polymethine dye represented by the following formula:

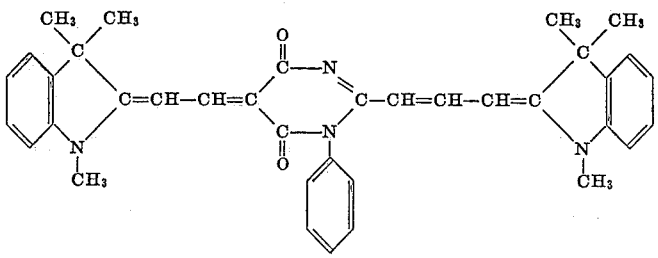

3. A polymethine dye represented by the following formula:

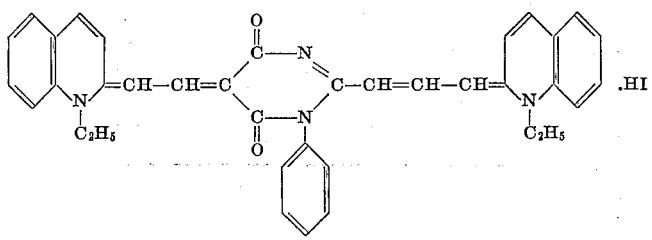

4. The polymethine dye represented by the following formula:

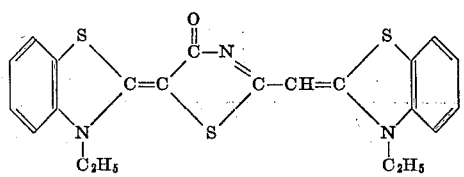

5. The polymethine dye represented by the following formula:

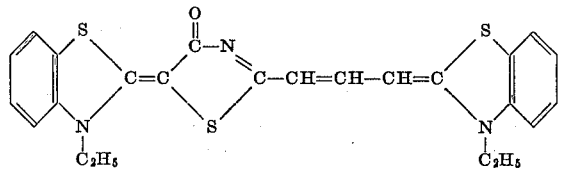

6. The polymethine dye represented by the following formula:

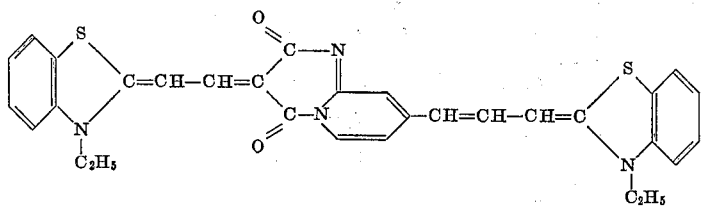

7. A polymethine dye represented by the following formula:

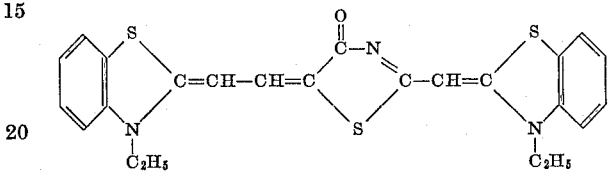

8. A polymethine dye represented by the following formula:

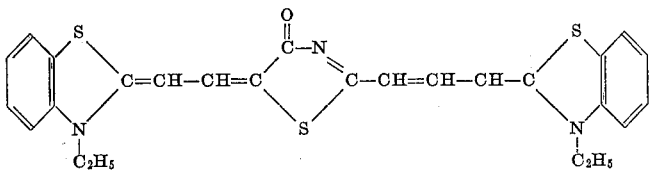

9. A polymethine dye represented by the following formula:

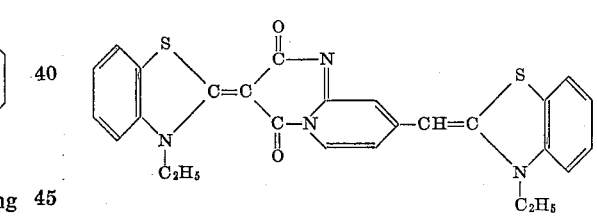

References Cited by the Examiner

UNITED STATES PATENTS

| | | | |
|---|---|---|---|
| 2,395,879 | 3/46 | Kendall et al. | 260—240.1 |
| 2,454,629 | 11/48 | Brooker | 96—105 |
| 2,471,996 | 5/49 | Anish | 260—240.1 |
| 2,514,649 | 7/50 | Knott | 260—240.4 |
| 2,735,767 | 2/56 | Brooker | 96—106 |
| 2,870,014 | 1/59 | Brooker et al. | 96—106 |
| 2,927,026 | 3/60 | Heseltine et al. | 260—240.1 |
| 3,080,363 | 3/63 | Horwitz et al. | 260—240.6 |

FOREIGN PATENTS 1,196,827   6/59   France.

WALTER A. MODANCE, *Primary Examiner.*

PHILIP E. MANGAN, N. BURSTEIN, JOHN D. RANDOLPH, *Examiners.*